United States Patent [19]

Fathauer et al.

[11] 3,979,055

[45] Sept. 7, 1976

[54] WEIGHING SYSTEM FOR CONVEYING MEANS

[75] Inventors: George H. Fathauer, Mesa, Ariz.; Wesley J. Bachman, Auburn, Ill.

[73] Assignee: A.O. Smith Harvestore, Inc., Arlington Heights, Ill.

[22] Filed: May 3, 1974

[21] Appl. No.: 466,678

[52] U.S. Cl. .............................. 235/92 WT; 177/16; 235/151.33

[51] Int. Cl.² .......................................... G01G 11/14

[58] Field of Search .................. 235/92 WT, 151.33; 177/16; 222/71

[56] References Cited

UNITED STATES PATENTS

| | | | |
|---|---|---|---|
| 2,927,785 | 3/1960 | Lyons | 177/16 |
| 2,954,969 | 10/1960 | McCullough et al. | 177/16 X |
| 3,036,769 | 5/1962 | Goslin et al. | 235/151.33 |
| 3,209,846 | 10/1965 | Karlen | 177/16 |
| 3,264,541 | 8/1966 | Mell | 177/16 |
| 3,390,731 | 7/1968 | Schierbeek | 177/16 |
| 3,578,955 | 5/1971 | Kloven | 235/92 WT |
| 3,754,126 | 8/1973 | Williams | 177/16 X |

*Primary Examiner*—Joseph M. Thesz
*Attorney, Agent, or Firm*—Andrus, Sceales, Starke & Sawall

[57] ABSTRACT

A forage conveyor-scale apparatus includes a pivoted conveyor having a differential transformer load cell providing a weight signal. A Hall cell unit is coupled to the conveyor to produce a speed signal. An automatic gain amplifier is controlled by the speed signal to vary the energization of the transformer from an oscillator. The output voltage of the transformer is rectified and averaged to produce a DC analog rate weight signal which is connected to drive a rate weight BCD counter and a total weight BCD counter. The analog signal drives a triggered integrator to form a pulse train driving the total counter. A dual slope integrator is controlled by the analog signal to cyclically control the weight rate counter. A single readout is provided and connected to the rate weight counter. The output of the total counter is forced through the rate weight counter to the readout to display the total count. A comparator may respond to a present input and the total counter to automatically terminate delivery.

30 Claims, 5 Drawing Figures

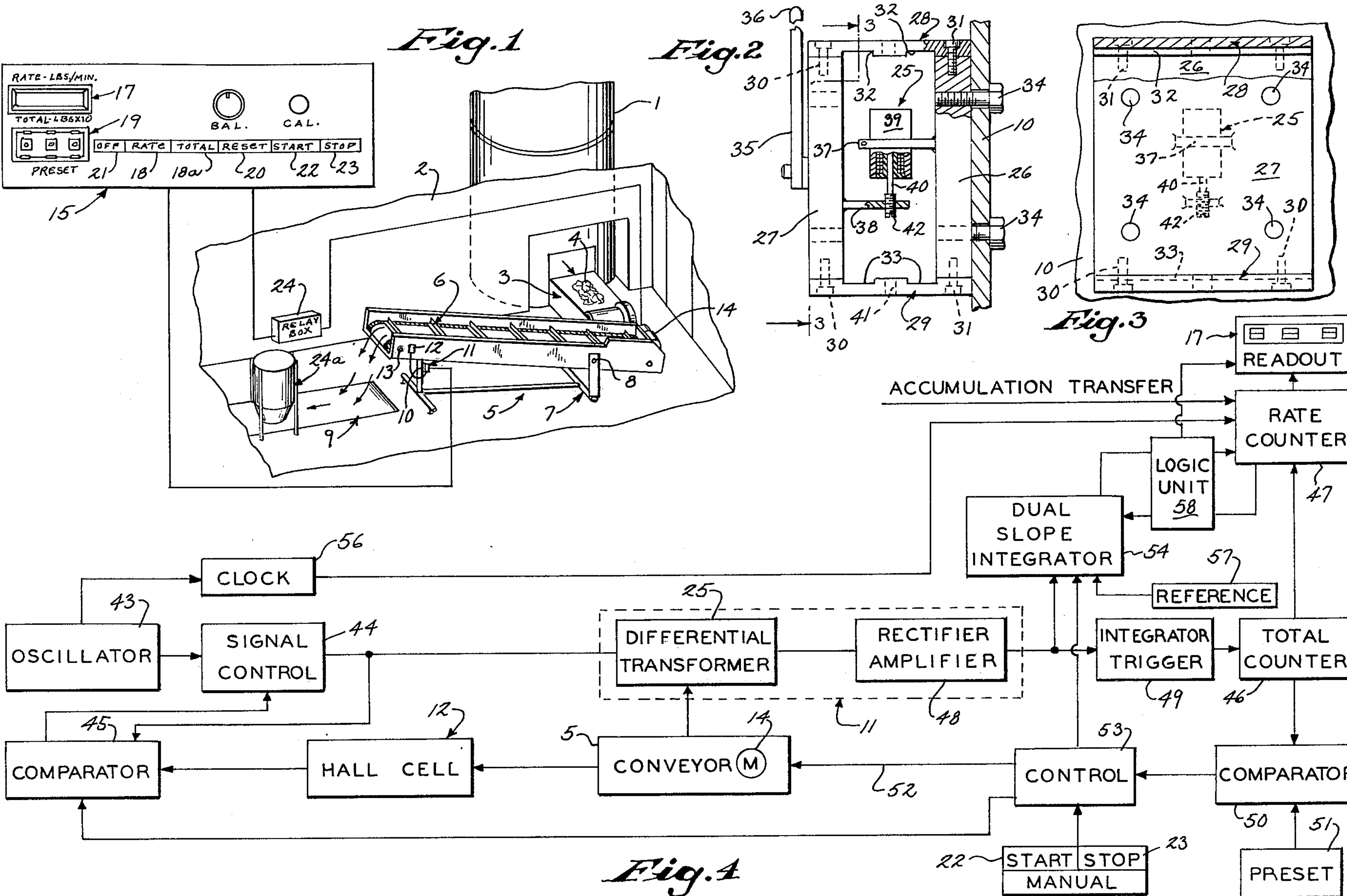
Fig.1
RATE-LBS./MIN.
TOTAL-LBS.X10
PRESET
OFF
RATE
TOTAL
RESET
START
STOP
BAL.
CAL.
RELAY BOX
Fig.2
Fig.3
ACCUMULATION TRANSFER
READOUT
RATE COUNTER
LOGIC UNIT 58
DUAL SLOPE INTEGRATOR
REFERENCE
CLOCK
OSCILLATOR
SIGNAL CONTROL
DIFFERENTIAL TRANSFORMER
RECTIFIER AMPLIFIER
INTEGRATOR TRIGGER
TOTAL COUNTER
COMPARATOR
HALL CELL
CONVEYOR M
CONTROL
COMPARATOR
START STOP
MANUAL
PRESET
Fig.4

WEIGHING SYSTEM FOR CONVEYING MEANS

BACKGROUND OF THE INVENTION

The present invention relates to a weighing system for a material conveyor means and in particular to a system continuously monitoring the weight of material delivered by a conveying means.

In industrial processes where various quantities of material are automatically conveyed, a means to measure the weight of the material delivered or moved is often desired. For example, in the automated livestock feeding systems, conveyors with automatic weighing means have been developed to automatically determine unit feed costs and to provide accurate records thereof. Thus, a special conveyor having a weighing means may be incorporated into a total feed system for delivering certain forms of stored material to a feeding structure or means. Alternatively, if desired a plurality of such automatic special conveyors with weighing means may be incorporated into a total operating system to monitor the feed of the several products to form a preselected mix.

Conventionally, in such weighing systems, the conveying structure is conveniently formed as a chain and flight conveyor of a relatively short length. A pivotal support is spaced from the receiving or input end and the discharge end is mounted for limited movement in accordance with the weight of the material on the belt. A suitable load cell secured to the supporting framework detects the actual movement and thereby produces a weight related signal. If the conveyor may operate at varying velocity and/or if a high degree of accuracy is desired, a velocity sensor can be coupled to the weighing unit and combined with the weight signal to provide an output signal or record indicative of the total weight of material conveyed per unit time. As such devices may be employed in outdoor environmental conditions, they must, of course, be constructed to properly operate in such environments. For example, in automatic cattle feeding and the like, the actual weigher may operate out-of-doors or within a limited enclosure where it is subject to relatively extreme variations in weather conditions. Further, the signal detecting and processing system must not be adversely affected by or vary with the changes in environmental conditions, such as temperature and humidity.

In addition to providing automatic measuring of the material delivered, an automatic cut-off may, of course, be desired after a particular quantity of material has been delivered.

Although various mechanical integrating systems have been suggested, the generation of electrical signals related to the weight and to the speed provide a more convenient and reliable means of recording the desired function, particularly with current solid state circuitry. The system would provide a plurality of signals including a rate weight signal, a total weight signal, as well as convenient readout means for indicating the rate and total conveyed weights. Although other systems have been suggested, the present invention is particularly directed to a reliable and improved method of generating and processing the necessary signals of weighing conveyor means.

SUMMARY OF THE PRESENT INVENTION

The present invention thus relates to a weighing system including means for detecting the rate weight of the material delivered to generate an analog rate signal which, in turn, is integrated and processed to control a rate digital counter which is periodically read out to produce a visual reading of the material delivery rate. In accordance with a particularly novel aspect of the present invention, a weight signal and a speed signal are combined to form an analog rate signal which is separately processed to form a digital total weight output and a digital rate weight output. A readout means is provided to display one or the other of the signals, with continuous updating at relative short intervals of the rate weight output. The one signal is thus normally displayed, with means for periodically transferring of the opposite signal. The rate weight system includes a plurality of presettable BCD counters driven from a clock source and cyclically operated with the analog signal as a control input to produce a rate weight output. A separate circuit converts the analog signal to a related pulse train which drives a total BCD counter. The total BCD counter is selectively coupled to the corresponding rate counter elements with the total count signal forced through the rate counters to the readout. The common readout means minimizes the complexity and expense of the display system while maintaining complete and necessary information available to the operator at all times.

Weight and velocity signals are generated by a pair of signal generators, one of which is energized from a suitable power supply with the level of energization controlled by the other of the signal generators to provide a combined output related to a directly combined signal related to the rate weight of material delivered by the conveyor.

A load cell including differential transformer is a practical means to provide a weight signal. The differential transformer preferable includes a parallelogram type support with a pair of opposite heavy mounting members joined by end spring members. The spring members are preferably provided with a pair of spaced milled portions defining spring portions permitting a large, linear deflection of the order of forty thousandths of an inch. The energization of the transformer is in accordance with a DC speed signal which produces a rate weight signal.

The DC speed signal is conveniently generated by a multiple pole rotating magnet coupled to a Hall cell. A oneshot pulse forming means is driven by the Hall cell to produce a related pulse train which is averaged to produce a corresponding DC signal. In an optimum novel construction, an electronic oscillator is connected through an automatic gain control amplifier to energize the load cell. The automatic gain control amplifier, in turn, is controlled by a comparison of the input to the differential transformer primary and the output of the speed sensitive signal. The automatic gain control will thus continuously modulate the coupling of the oscillator to the differential transformer until such time as the energization level is directly related to and proportional to the speed sensing signal. The output of the differential transformer is an AC analog signal, directly proportional to the weight rate. This analog signal signal is then suitably processed to drive the weight rate indicator, the total weight indicator as well as any other function or control desired.

In accordance with an optimum preferred circuitry for producing of the analog rate signal, a half-wave rectifier is connected to the transformer. The rectified signal is fed to a suitable averaging amplifier to produce a DC analog output signal directly related to the weight rate. This signal is employed to drive a suitable integrator and trigger circuit to produce a train of pulses directly related to the total weight of material delivered. The pulse signals are coupled to drive a BCD digital total counting circuit to maintain a complete reading of the total material delivered. The total accumulated weight reading may be coupled to a comparator circuit to terminate operation at a selected preset total weight delivery. This can be conveniently provided through digital comparators with the input set through a binary coded decimal system to read a particular weight.

The DC analog rate signal is applied through a special rate integrator to drive a separate BCD rate counter having presettable counting stages to continuously record and track the rate weight characteristic at any given instant. A very convenient reliable integrator employs a dual slope integrator coupled to drive digital presettable counter stages which are driven from a suitable clock source. The integrator is operated to oppositely integrate the analog signal for a fixed time and then to oppositely integrate a reference signal to generate one rate counting cycle. A logic circuit means is connected to the integrator and to the counter to selectively and alternately connect the analog signal detection means and the reference source to the integrator with cyclical operation of the counter. The output of the counter is coupled to the end of each update cycle to drive a visual display system such as a seven segment light emitting diode unit. This system is particularly desirable in connection with light emitting diodes and the like where the continuous updating while detecting would result in a continuous flickering characteristic in the readout. The total or accumulated weight is directly read out by coupling of the total counters to the readout device through the rate counters. Thus, as is well-known in the counting art, it is possible to directly force the readout from one set of counters through another set of counters into the readout elements as such.

Rather than the direct readout, the analog rate signal could, of course, be employed as a part of a feedback system to control the rate feed and to maintain a proportioning type control. The total electronic energizing and processing circuit may be constructed of integrated solid state integrated circuitry and components and thus provide a highly reliable and temperature stable signal processing circuitry to maintain reliable detection and readout of the rate and the total weights.

BRIEF DESCRIPTION OF THE DRAWINGS

The drawings furnished herewith illustrate a preferred construction of the present invention in which the above advantages and features are clearly disclosed as well as others which will be readily understood from the following description.

In the drawings:

FIG. 1 is a simplified pictorial view of an automatic cattle feeding apparatus incorporating a weighing conveyor structure constructed in accordance with the present invention for continuously monitoring the material delivered to a feed bunk unit;

FIG. 2 is a view of a portion of a load cell unit shown in FIG. 1;

FIG. 3 is a side view of FIG. 2;

FIG. 4 is a block diagram illustrating a control system for the monitoring and readout apparatus shown in FIGS. 1–3.

DESCRIPTION OF THE ILLUSTRATED EMBODIMENTS

Figure 5:
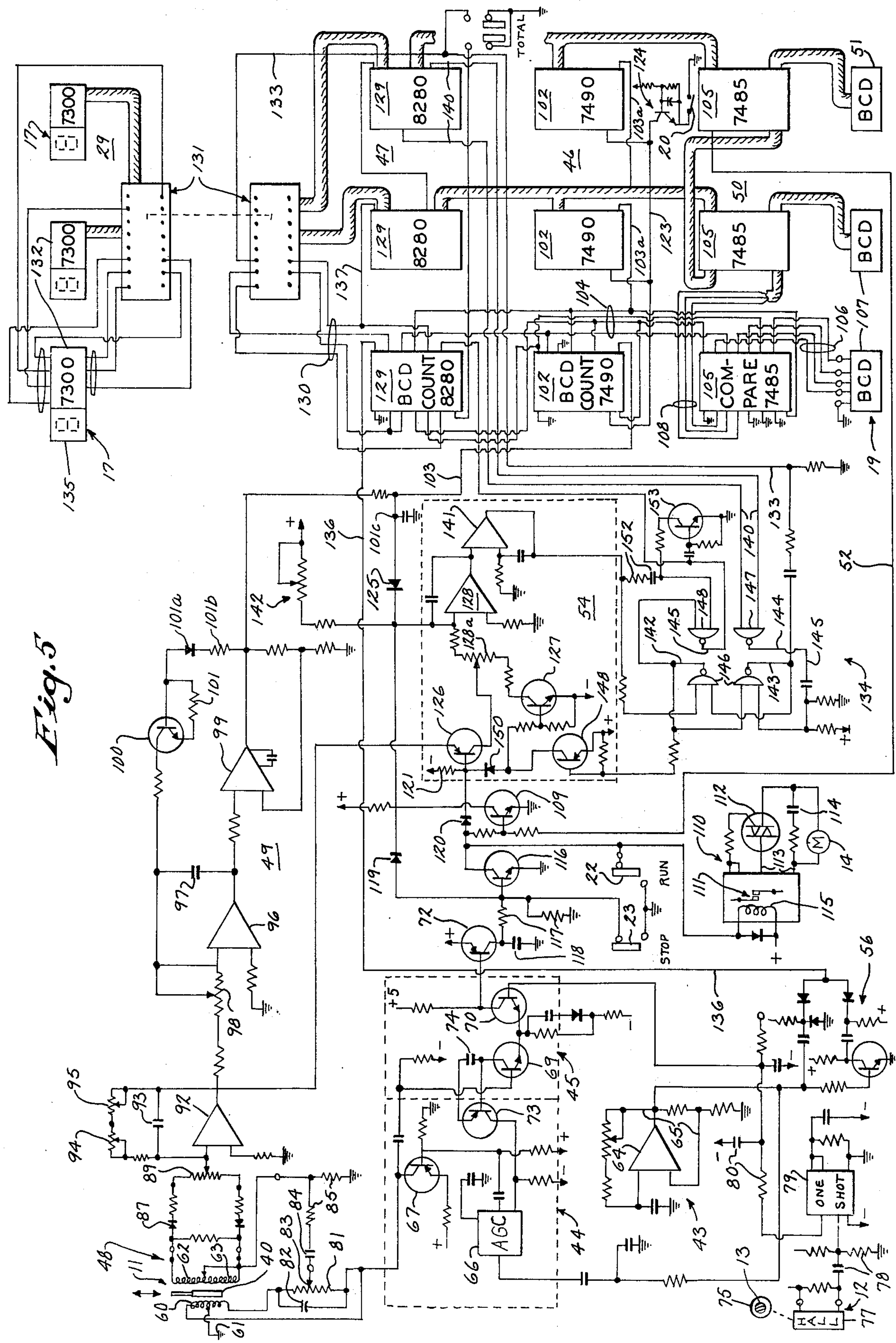
FIG. 5 is a schematic circuit diagram of the block diagram illustration.

Referring to the drawings and in particular to FIG. 1, a feed storage or silo structure 1 is mounted adjacent a building structure 2 and includes an unloader unit or mechanism 3 adapted to remove the stored feeding material or forage 4 from the storage unit. Generally, in the illustrated embodiment of this invention, the material, as it is removed from the storage unit 1, is fed onto a weighing apparatus or conveyor 5 which automatically and continuously weighs the forage material 4 as conveyed. Generally, the illustrated conveyor 5 includes an endless chain and flight assembly 6 which is mounted within a suitable framework 7. The framework 7 is pivotally mounted near the in-feed end as at 8 adjacent to the unloader unit 3 and extends upwardly and deposits the forage 4 into a further conveying means 9. The opposite end of the framework 7 is supported by an electronic load cell, unit 11, which is mounted on a bracket 10, the electronic load cell unit 11 physically supports the free outer end of the conveyor 5. The load cell unit 11 is displaced in accordance with the weight on the conveyor 5. Thus, the forage weight is transmitted to the load cell unit 11, the output of which is suitably processed to indicate the weight of the material delivered. The actual weight delivered in any given period is, of course, directly related to the delivery rate of the unloader 3. In accordance with the present invention, a speed sensing assembly 12 is coupled to the conveyor head shaft 13 of the chain and flight assembly 6, and, therefore, provides an output signal directly related thereto. The conveyor and particularly assembly 6 is coupled to a drive motor 14. The speed related signal is processed and combined with the weight related signal at the load cell unit 11 to form a combined rate output signal which, in turn, is further processed to provide a record of the total weight of material delivered signal and a rate weight signal. A weigher control unit 15 is mounted adjacent the conveyor assembly 5 and coupled to the speed signal generator 12 and the load cell unit 11 to provide the desired interrelationship and control therebetween including means to automatically stop motor 14 after a selected delivery of forage 4. Generally, the control unit 15 includes means to adjust the various aspects of the unit and in particular includes a digital read-out or display window 17 which can, through the actuation of a pair of manually operable switch buttons 18 and 18a, be set to read the rate output or alternatively the total output. Further, the desired total weight to be delivered in any given operating cycle may be digitally set into the control by the manual setting of individual preset unit 19 which provides a visual display of the setting. A reset button 20 is provided to reset the counting mechanism both in the display unit and in the actual processing circuit at the start of each cycle, as hereinafter described. A main on-off control button 21 is also provided. Motor start and stop buttons 22 and 23 are also provided to manually start and stop the conveyor unit 5. The control unit 15 is connected to a relay box 24 which includes this motor contactor coil, not shown, for supplying power to the motor 14. The motor energization latches in to operate conveyor 5 to receive material 4 from the storage unit 1 and transfer it to the collection conveying means from which it is fed to the feed bunk, not shown.

During the feeding process, a supplement feeder 24*a* may be provided to introduce additional supplemental material. Further, other storage structures might be interrelated with the illustrated portion of the system to provide a complete feed system with automatic means for controlling the relative proportions of the respective products.

The illustrated system will automatically detect and monitor the weight of the material 4 being transferred by the belt conveyor 5 and, with the "rate" pushbutton 18 activated, include a continuous up-dated read-out of the rate of transfer on the visual read-out section 17. If it is desired to know how much of the total desired acount has been transferred, the operating personnel merely actuates the total button 18a and the readout 17 is automatically switched to display the corresponding total amount of material delivered to that time. When the desired preset amount has been fed through the conveyor unit 5, the contactor coil is de-energized and shutdown automatically occurs by terminating operation of the motor 14, and if so connected, also the unloader 3.

Referring particularly to FIGS. 2 and 3, the load cell unit 11 is shown especially constructed and coupled to the conveyor 5 and particularly the frame structure. The load cell unit 11 includes a differential transformer unit 25 suitable supported within a special parallelogram support. As shown most clearly in FIGS. 2 and 3, the support includes a pair of parallel vertical mounting arms 26 and 27 of a relatively heavy plate-like construction. The arms 26 and 27 are interconnected by upper and lower special spring arms 28 and 29 rigidly secured to the arms 26 and 27 by clamping bolts 30 and 31. Each of the arms 28 and 29 is similarly formed with a pair of spaced milled-out portions 32 and 33 within the length between the vertical mounting arms 26 and 27. The one vertical arm 26 is firmly bolted as by bolts 34 or otherwise affixed to the conveyor subframe 10. A load cell push bracket 35 is similarly affixed to the opposite arm 27 and projects upwardly with an upper cylindrical edge support 36 on which the conveyor frame rests and is supported. The spring arms 28 and 29 deflect to permit linear movement of the push bracket 35 and arm 27 relative to arm 26. The milled-out portions 32 and 33 permit relatively large linear deflection of the order of 40 thousandths of an inch while the heavy bolted ends permit large bolt clamping forces to prevent possible slippage with deflection. Such slippage would result in erroneous relative vertical movement of arms 26 and 27. A pair of vertical spaced parallel mounting plates 37 and 38 are secured one each to arms 26 and 27 and between such arms in overlapping relationship. The transformer 25 includes a winding bobbin 39 secured to the upper plate 37 which is fixed to frame arm 26 and a coupling core 40 secured to the lower plate 38 which is fixed to the support arm 27. The core 40 is coaxially disposed within winding bobbin 39 and positioned therein in accordance with the weight on the conveyor 5. The lower spring arm is provided with an opening 41 providing access to adjustment screws 42 for relative axial positioning of the bobbin and core.

Referring particularly to FIGS. 2 and 4, the differential transformer 25 is energized at a suitable frequency such as $2560H_z$ generated by a suitable source such as a high frequency oscillator 43. The amplitude of the energizing signal is controlled by a signal control unit 44 which, in turn, is sensitive to the output of the speed sensing unit 12 which provides an electrical signal proportional and directly indicative of an instantaneous speed of the assembly 6. A comparator 45 compares this signal with the weight related output of the signal control unit 44. Any difference is detected and fed back to actuate the signal control unit 44 to adjust the amplitude of the oscillator signal until in predetermined relationship to the output of the speed sensitive sensing unit 12, which, as more fully developed hereinafter, is preferably a Hall cell unit. The output of the oscillator 43 is therefore continuously modulated to an amplitude directly related to and indicative of the conveyor speed.

The LVDT unit 11 is, therefore, energized in accordance with the weight times the speed factor and its output is an analog signal directly related to the feed rate of the conveying unit 5. This analog signal is rectified and amplified by a suitable circuit 48 to provide a DC analog signal which is employed to drive a total counter 46 and a rate counter 47. The total counter 46 is driven from an integrator trigger circuit 49 connected to produce a pulse train at a repetition rate or frequency related to the amplitude of the rectified DC signal of circuit 48. Thus, for example, the triggered signal may be a series of pulses, with a single pulse produced for each ten pounds of material actually delivered. The output of the total counter 46 is fed as one input to a comparator 50 and compared with the input of a preset unit 51. Upon a total feed equal to the preset amount, a total signal is fed back via a stop signal line 52 to a control unit 53, the output of which is connected to the conveyor 5 and to the comparator unit 45, and to a dual slope integrator 54 forming a part of the rate weight counting circuit. The unloader 3 and conveyor 5 are stopped to terminate further material feed.

The amplified analog DC signal of circuit 48 is also coupled to drive the rate counter 47. The rate counter 47 is a suitable presettable digital counting driven from a suitable clock unit 56 which, in turn, is driven by the oscillator 43. By suitable resetting of the rate counter 47 at appropriate intervals, the weight per unit of time is automatically created. In the illustrated embodiment, the amplified DC analog signal and a reference signal source 57 are alternately applied to the dual slope integrater 54. The dual slope integrater 54 integrates for a period in accordance with the variable DC analog signal and is reset by opposite integration for a given period by the fixed reference signal. The output of the dual slope integrater 54 is interconnected through an interlocking circuit 58 to drive the rate counter in accordance with the DC analog signal. The period that the drive is activated is determined by the amplitude of the DC signal and automatically reset at the end of the integration period as a result of a feedback signal of the rate counter 47 through the interlock circuit 58. At the initiation of the reset cycle, the rate counter 47 and a visual read-out 59 are enabled to transfer the output of the rate counter 47 into the read-out unit 59 to up-date the visual display 17 of the weight rate. The read-out unit 59 is latched into the last detected reading until the rate counter 47 is again recycled to provide a new integration of the DC analog signal and produces a further update of the rate weight.

Further, in accordance with a further significant aspect of the present invention, the digital rate counter 47 is coupled to the total counter 46. Control signal switch 18 is connected to selectively activate the rate counter 47 to operably disconnect it from the dual slope integrator 54, force it to read in accordance with the total counter 46 to which it is connected and to display the total counter in the read-out unit 17 and thereby directly present the total accumulated weight instead of the rate weight.

This dual read-out provides a convenient, reliable and low cost means for selectively indicating the rate characteristic of the conveyor and the total weight in comparison to the desired total weight being delivered, as desired. The system is also particularly adapted to a solid state type control thereby readily adapting it to the environmental conditions encountered in cattle feeding and the like.

A particularly satisfactory and novel circuitry is shown in FIG. 5 where the several block diagram and illustrated components are shown in a preferred schematic construction. The linear voltage differential transformer unit 11 is shown including a primary winding 60 having a grounded center tap 61 and with the opposite ends of the winding coupled to be driven from the oscillator 43, the output of which is modulated to produce a variable amplitude high frequency source as hereinafter described. The primary winding 60 is coupled to a center tap secondary winding, with the degree of coupling controlled by the position of the conveyor positioned core member 40. The center tap defines a pair of coils 62 and 63 which are oppositely wound to produce series connected signals which differ by 180 degrees. As shown in FIGS. 1–3, the core member 40 is coupled to the pivotally mounted conveyor 5 and is displaced directly in accordance with the weight on conveyor 5. Generally, the core 40 is centrally located to provide a balanced or zero output voltage from the pair of oppositely wound secondary windings 62–63, with the conveyor 5 in an unloaded condition. As soon as the forage is delivered to the belt conveyor, the core 40 is correspondingly offset to produce a corresponding net alternating current output signal. In the preferred construction, the primary winding 60 of the differential transformer 11 is connected to the oscillator 43 through the signal control unit 44, which modulates the output of the oscillator. The oscillator 43 is shown as a conventional operational amplifier 64 with the appropriate resistive-capacitive feedback network 65 to produce an appropriate high frequency output; for example, 2,560 Hz which has been found to provide a satisfactory frequency for operation of the differential transformer. The output of the oscillator 43 is capacitive coupled to the signal control unit 44 which includes an automatic gain control amplifier 66. The output of the amplifier 66 is coupled through a buffer transistor 67 to the input of the primary winding 60.

The automatic gain control amplifier 66 may, of course, be of any suitable construction having a controllable input 68 for varying the amplitude of the output in accordance with a DC input signal which is generated by the comparator 45 comparing the actual oscillator output with the speed related reference signal. In the illustrated embodiment of the invention, the comparator 45 includes a pair of NPN transistors 69 and 70, the first of which is capacitive coupled to the output or energizing line connected to the primary 60 of the differential transformer 11. The comparator transistor emitters are connected in common to B minus through a capacitive-resistive network 71. The collector of the speed driven transistor 70 is connected to B plus through an on-off control transistor 72 which, in turn, is connected to interlock circuit 52 for related continuous conveyor drive, as hereinafter described. The base of the comparator second transistor 70 is connected to the DC speed responsive signal generated by the Hall cell unit 12. The transistor 69 has its collector connected to a driving transistor 73, the output of which is connected directly to the control or modulating input 68 of the automatic gain control amplifier 66. The driving transistor 73 includes a small capacitor 74 connected across the base to the emitter circuit and thus defines an average of the bias on the transistor 73.

In operation, the transistor 69 is driven by the peak output signal of the high frequency primary energizing signal, while the other transistor 70 is driven by an average DC signal related to the conveyor speed. The automatic gain control signal of transistor 73 continuously varies to match the peak signal to the average DC speed signal and thereby continuously modulates the energization of the differential transformer 11 in accordance with the speed signal.

In the preferred construction of the invention, the DC speed related signal is generated by the Hall cell unit 12. As diagrammatically illustrated, a small annular permanent magnet 75 is coupled to the conveyor head shaft 13 and periodically impresses a magnetic field reversal upon a Hall cell 77 to generate an output signal related to the speed of the conveyor 5. The output is differentiated by a suitable capacitor-resistor differentiating circuit 78 and applied as the input to a one-shot circuit 79, the output of which is a pulse of a predetermined constant width. The output frequency of the one-shot unit 79 is of course directly related to the input and which, in turn, is controlled by the output of the Hall cell 77. The pulse train from the one-shot unit 79 is integrated through a suitable resistor-capacitor network 80 to B minus to provide an average DC signal which is coupled to the base of the comparator transistor 70 such that a speed modulated signal is applied directly across the primary winding 60 of the transformer.

A compensating network is connected in parallel with the primary 60 and includes a potentiometer 81 and a capacitor 82 in parallel. The tap 83 of the potentiometer 81 is connected to ground through a capacitor 84 and a pair of series voltage dividing resistors 85.

The output of the differential transformer 11 is a weight signal modulated in accordance with the velocity to form a high frequency analog signal indicative of the weight rate of the conveyor 5. This signal is rectified and amplified through the rectifier-amplifier 48, which, in FIG. 5, is a half-wave rectifying network including a load resistor 86 connected directly across the series-connected secondary windings 62–63. A halfwave rectifying branch circuit is connected across the resistor 86 and includes a first diode 87 in series with a plurality of resistors 88 including a centrally located potentiometer 89 and a second return diode 90 to the opposite side of the series connected secondary. The output of the pair of secondary windings 62–63 is thus two signals 180° out-of-phase and producing a net signal during each half-cycle when they are not in precise balance. During the one-half cycle, the net signal is conducted by the halfwave diode rectifying circuit to develop a corresponding DC voltage pulse at the tap of the potentiometer 89 to drive the counters 46 and 47. An operational amplifier 92 has an input connected to the rectified signal, with an averaging capacitor 93 feedback. A pair of series-connected calibrating resistors 94 and 95 is connected in parallel with the capacitor 93 such that the output is an average DC analog signal of the half-wave rectified input signal generated by the differential transformer and directly proportional to the weight rate of the material being delivered by the conveyor.

This DC signal is applied to drive the total counter 46 and the rate counter 47. The DC signal is resistively coupled to the trigger unit 49 which includes an input operational amplifier integrator 96 having a feedback capacitor 97. A variable input potentiometer 98 connects a proportion of the DC signal as the input. The output of the amplifier integrator 96 is connected to a DC trigger circuit which includes an inverting amplifier 99. A transistor 100 is connected between the integrating capacitor 97 and the output of the inverter amplifier 99. The transistor 100 has its emitter to base circuit coupled by a resistor 101 and the interconnected base circuit connected by a diode 101*a* and a base resistor 101*b* to the output of the amplifier 99. The collector of transistor 100 is coupled to the top side of the capacitor 97 and thus provides a discharge network for the capacitor upon turn-on of the transistor 100 which functions as gated switch responsive to a preselected voltage level of capacitor 97. Thus, the integration continues until such time as the voltage across the capacitor 97 reaches the triggering level, at which point the negative signal appearing at the output of the inverting amplifier 99 biases the transistor 100 on, thereby producing a pulse output signal and simultaneously resetting the integrator 96. The pulses occur at periodic intervals or a frequency which is directly related to the level of the DC rate voltage signal from the unit 48. The output is thus a pulse train directly related to total weight of the material delivered.

This pulse train is coupled by a resistor-capacitor 101*c* connected directly as the clock input to the total or accumulating counter 46 which in the illustrated embodiment of the invention includes three binary coded digital counter registers or units 102 for counting up to 999 in increments or units of 10 pounds to a total weight to 9990 and provide a readout of the pounds. In accordance with well-known operations, the pulse signals are fed into the least significant counter register 102, via clock line 103 which counts the first 10 weight units and sequentially transfer weight units to the second significant register 102 and the third significant register 102 as clock signals to maintain a continuous accumulation of the signals. The registers 102 are each illustrated in block diagram as 7490 register which is a conventional solid state counter having the clock input and four binary coded decimal output signal lines 103 which relates respectively to the binary numbers 1, 2, 4 and 8. Thus, the most significant digit position, number 8, is coupled as the clock input to the next succeeding register 102 as shown by the line 103*a.* The binary output of each register 102 appears at the set of four related binary coded decimal output lines 104 which are coupled into a set of inputs of a corresponding BCD comparator unit 105 of comparator 50. Each of the comparator units 105 is also a well-known digital type comparing device, those illustrated being identified by the corresponding commercial identifying number 7485 having a first set of inputs connected to lines 104. A second set of corresponding BCD terminals are connected by a multiple line cable 106 from the binary coded decimal input signal units 107 of the preset unit 19. Three output lines 108 of comparator 105 are provided indicating whether or not the comparison is equal, greater than or less than the preset number. Only when the most significant number provides an equal condition is an enable condition transferred to the next significant digit comparator unit 105. Thus, at all times, the three comparator units 105 provide a continuous monitoring of the corresponding binary coded digit signals appearing in the accumulating comparator stages. When and only when equality is detected at all three stages 105 will the least significant number generate an output signal which is connected via the coupling line 52 to an input transistor 109 of the control unit 53.

The control unit 53 is shown as a transistorized driving circuit selectively supplying power to a motor supply circuit 110.

Thus, the supply circuit 110 for the contactor coil, not shown, for the conveyor motor 14 is illustrated including a reed relay switching circuit including a set of contacts 111 connected to selectively supply power to the gate of a main Triac switch 112, the output of which is connected in series with the motor contactor coil, not shown, to suitable power supply lines 113 in parallel with a stabilizing resistor-capacitor 114 to control motor 14. The reed relay winding 115 at one side is connected to a B+ and the other side is connected to ground through the control circuit 110.

To initiate operation independently of the interlocking weighing control and with the preset and total amounts coinciding, push button clean out switch unit 22 is provided. When closed, switch 22 directly connects the signal side of the relay winding 115 to ground and provides continuous energization of the contactor coil and firing of the Triac as long as the switch is closed. Alternately, momentary closure initiates operation of the conveyor 5, which automatically energizes the interconnecting control circuit 45 to maintain conveyor operation upon opening of the run switch 22, as follows.

An alternate ground path is provided through a control transistor 116 shown as an NPN type which, in turn, is driven on by the speed responsive signal generated by the Hall Cell unit 12. Thus, the B+ supply transistor 72 has its base connected to the collector of the comparator transistor 70 and is driven into conduction whenever the Hall Cell unit 12 turns on the comparator transistor 70. The B+ supply transistor 72 includes two series-connected collector resistors 117 connected to ground in parallel with a stabilizing capacitor 118. The junction of the collector resistors 117 is connected to the base of the control transistor 117 and thus adapted to drive it "on" and to provide a ground return path for the reed relay unit 110 whenever the conveyor 5 is actually operating. This will maintain a ground return circuit around the run clean-out switch 22 after the initial starting of the conveyor 5 and maintain continued operation thereof independently of such switch 22. The base of the transistor 116 is, however, also connected by a diode 119 directly to the collector of the interlock transistor 109, the base of which is coupled to and controlled by the output of the digital comparator 50. Thus, when the interlock transistor 109 is driven on, it provides a ground path through the diode 119. Transistor 116 now turns off and opens the ground circuit of the reed relay unit 110, contacts 111 open and stops operation of the conveyor unit 5.

The turn-off signal is also coupled by a diode 120, which may be a pair of series-connected diodes to provide proper characteristics, and a resistor 121 to a negative bias supply connection to control the dual slope integrator 54 of the rate counting circuit. Thus, the latching circuit drives the conveyor off and simultaneously provides a turn-off signal to the rate counter to terminate operation of the rate counter 47, as hereinafter described.

The total counter unit 46 includes a common reset line 123 connected to each of the counter stages 102 and to a pulse source 124. In the illustrated embodiment of the invention, the pulse source 124 constitutes a normally conducting transistor connected to ground in series with a manually operable reset switch 20. Thus, to reset the counter register 102, the operator opens the ground circuit by actuation of the reset switch 20 and automatically returns all of the counter stages 102 to a reference or zero reading.

The stop switch 23 is connected to directly ground the base of the control transistor 116 to allow the operator to terminate operation of the conveyor 5 and hold the last reading. This may be done to permit manual removal of material or the like. The termination of the conduction of the control transistor 116 provides a clamp on the total slope integrator circuit 49. Thus, a clamping diode 125 interconnects the pulse forming resistor-capacitor 101 to inhibit the trigger integrator 49 to suspend the weighing during the time the stop button 23 is closed as the material on conveyor 5 would continue to trigger the accumulator counter 46. The total count may therefore be stored indefinitely under these conditions. When the system is manually stopped, a complete or part of one cycle of the integrator may be lost, representing up to ten pounds. As the load conveyed will normally approach the magnitude of a thousand pounds or at least hundreds of pounds, the loss is insignificant and allows proper operation of the circuit by recycling and restarting of the circuit from zero reference conditions.

Simultaneously, with the total accumulating count, the rate count is continuously recorded in the rate counter 47. The dual slope integrator unit 54 includes a weight rate transistor 126 and a reference transistor 127 connected to selectively provide a corresponding current input to a dual slope operational integrating amplifier 128 which is connected to control the operation of the rate counter 47. The transistor 126 and 127 selectively connect the analog signal of unit 48 or a reference signal via a potentiometer 128a to the input of the amplifier 128.

The rate counter 47 includes three resettable registers 129, each of which is a BCD presettable type. Each register 129 will count to digit nine, roll over and initiate a new count from zero to nine automatically. The output digit in a binary coded decimal logic appears on four BCD output lines 130 connected to the visual display 17 by a readout coupling 131 and a decoder 132. An enable line 133 from a logic switching circuit 134 of unit 58 in FIG. 4 is periodically signalled by the operation of the slope integrator 128 to update the display. Each display digit section of display unit 17 may be of the known 7-segment light emitting diode construction 135, with the associate decoder 132 providing energization of the appropriate segments to present the digit count in the related counter stage 129 at the time. The least significant digit stage or register 129 includes a clock input connected to a standard clock circuit 56 driven from the oscillator 43. The illustrated clock circuit 56 is a transistor-diode unit which establishes a predetermined fixed clock rate, for example, 5,000 pulses per second to correspondingly drive the register 129. The clock circuit 56 is connected by line 136 to the least significant digit counter 129, shown to the left in FIG. 5. Clock transfer lines 137 provide for transfer of the count to the next stages 129.

The several registers 129 have similar resets connected to a common reset line 138 from the logic switching circuit 134.

The integrator amplifier 128 is of the dual slope type and is alternately connected to the reference signal or the weight rate signal providing an input voltage to the amplifier 128 to provide an interlocked control by and of the counter 47. Integration is for a predetermined constant time of the weight rate signal and the slope of the integrated ramp signal is variable and corresponds to the input voltage, or current, level.

More particularly, the rate count 47 is driven from the constant clock source 56 and during the cycle produces a switching signal, at a pair of feedback lines 140 connected to the most and least significant output line of the most significant digit stage 129 to transfer from the weight rate transistor 126 to the reference transistor 127 for establishing the constant integrating period. The counter 47 thus actuates the logic unit 134 and the reference voltage is then provided via the reference transistor 127 and the integrator returns back to ground or zero at a fixed slope. The output of the amplifier is coupled to an inverting and pulsing amplifier 141 to generate a negative pulse of short duration which is coupled to activate the logic unit 134 to update the visual display 17, reset the counter 47 and connect the rate weight signal to the integrator 49. A reference zero bias supply 142 is coupled to the dual slope integrating amplifier 128 to provide a predetermined minimum current adjustment and thereby adjusts the minimum slope rate during the weight count cycle. Thus, with a zero weight rate input applied via the transistor the dual slope integrator integrates up and down to produce a zero output.

In the illustrated embodiment, counter 47 counts to 900 and then produces an output signal to switch to the reference signal. The counter 47 continues to count to 1,000, rolls over and continues a new count until the integrating amplifier 128 passes zero at which time a signal is generated to detect the recorded number, transfer such number to the visual display 17 and recycle the counter 47.

The dual slope integrator 49 and rate counter 47 are properly cyclically coupled by the logic unit 134 which includes a first output line 142 which is coupled to fire the slope integrator 49 to apply the reference signal, the second output line 143 which is coupled to line 133 to transfer the count to the readout devices, a third output line 144 which is coupled to reset the counters and a fourth output line 145 to recycle the integrator 49. Logic unit 134 includes a first pair of two input NAND gates 146 connected to define a flip-flop circuit with the outputs connected to lines 142 and 143. A second pair of two input NAND gates 147 and 148 form the outputs to lines 144 and 145 for resetting of the integrating circuit of the counters.

The flip-flop gates 146 have a first input connected to the output of switching amplifier 141 of the dual slope integrator 54 and a second input connected to the output of resetting gate 147. When the rate transistor 126 is on, a signal is coupled via the potentiometer 128a to the integrating amplifier 128. The integrated signal is applied to the switching amplifier 141 which is at relatively high level during the integration. When the counter 47 reads 900, the gate 148 is set and pulses one of the gates 146 to set the flip-flop and turn on a referencing control transistor 149 by completing the positive supply of the base to emitter circuit. The transistor 149 then applies a positive voltage to the base of the signal transistor 126 via a diode 150 and the the base-emitter of transistor 127. As a result rate transistor 126 turns off removing the weight rate signal and transistor 127 turn on applying the reference signal to amplifier 128.

The integrator 128 now sweeps back toward zero or reference. During this period amplifier 141 is held at the logic "1" level and the counter 47 continues to count, rolling over at 1,000. When the integrator sweeps to zero, the switching amplifier 141 drops to a logic "0" or relatively low level. The low level signal is applied to the reset gate 146 of the flip-flop unit which resets.

The output of the first NAND logic gate 146 now generates a pulse signal through a capacitor-resistor network 151 to generate an enable latch signal at the latch line 133. The output signal activates the readout device to gate the number then in the rate counter 47 into the readout device 29 to update the record which is latched in even though the latch signal is removed and counter 47 reset. The reset of the flip-flop unit also removes the reference transistor 127 and reconnects the transistor 126 and amplifier 141 raises its output. The output signal of the inverting integrating amplifier 141 is, therefore, a pulse signal of the order of forty microseconds wide or the like. The leading edge generates the strobe signal. The trailing edge generates a small reset pulse which is a positive going signal coupled down through a capacitor-resistor network 152 to the reset gate 148 and a holding transistor 153 which functions as a "one-shot" or pulse stretcher means. This provides a sufficient reset pulse to reset the three counting stages 129 of counter 47, which begins a new cycle count.

The clock pulses are being generated at a relatively slow rate compared to the switching time of forty microseconds, for example, at a rate of approximately 5K. Consequently, the counter 47 sequentially detects the zero crossover point on the return integration to the reference or zero level to first enable and transfer the count into the readout, to reset the integrating circuit from the reference signal to the rate enable signal and to reset the counter within the period of a single count pulse to provide reliable and continuous rate count reading and updating at periodic time pulses. In this manner there is a continuous rate counting with each updating signal being transmitted to the readout unit 29 and providing storage for the rate counter on a periodic basis.

Alternatively, the system is set to provide indication of the total output by actuation of the total control switch 18. This switch, in essence, grounds the common data strobe input 154 of the stages 129 and simultaneously provides a continuous enable and latch line 133 to readout coupler 131. The total counter stages 102 have the binary coded decimal output lines 104 coupled to the comparator stages. These same lines 104 are also coupled as data input lines to the three stages 129 of the rate counter 47. The data strobe input 154 of the rate counter 47 provides for direct transfer of the accumulated signal to the digital readout unit 17. In essence, it effectively disables the rate counter signal and provides forced readout through the rate counter directly to the readout unit 17.

The present invention thus provides a reliable and unique digital recording and readout means for electronic scale conveying apparatus which is particularly adapted to being driven from the novel sensing and combining means.

Various modes of carrying out the invention are contemplated as being within the scope of the following claims, particularly pointing out and distinctly claiming the subject matter which is regarded as the invention.

We claim:

1. An electronic scale conveyor apparatus having a conveyor element for through flow of material, comprising detection means for generating a rate weight signal proportional to the weight of material delivered per unit of time by said conveyor element, a digital rate counter, a clock source for driving said digital counter, logic circuit means coupled to said detection means and said digital counter to cyclically actuate said counter to detect the weight rate of material conveyed, a counter readout, and readout transfer means for operatively coupling the readout to the counter, said transfer means being connected to said logic circuit means to transfer the output of the counter to the readout with each cycle of said counter, pulse means for generating a pulse train signal having a repetition rate corresponding to a predetermined function of the rate-weight signal, a digital total counter connected to said pulse means to record the total weight delivered by said conveyor element, and means coupling said digital total counter to said rate counter and including total transfer means to force set rate counter to the setting of the total counter and to transfer the output to the readout.

2. The electronic scale conveyor apparatus of claim 1 including an energizing circuit for the conveyor element, a bistable switching means including a first control switch connected in the energizing circuit for the conveyor element and a second control switch connected to control said first control switch and said integrating circuit means and said pulse signal source, and said total counter connected to said second control switch to deenergize the energizing circuit for the conveyor element and to operatively disconnect the rate signal from the integrating amplifier and to clamp out the pulse signal generator in response to delivery of a preselected total weight of material.

3. The electronic scale conveyor apparatus of claim 2 including means to selectively deenergize the energizing circuit and stop the conveyor element, and means to inhibit said pulse generator to initiate a new integration cycle upon restarting of said conveyor element.

4. The electronic scale conveyor apparatus of claim 1 wherein said rate counter includes a plurality of binary coded decimal stages including a most significant digit stage and a least significant digit stage, said stages being connected to count to the maximum number and to recycle to a new count, said total counter having a corresponding plurality of binary coded decimal stages connected to transfer the total count to the stages of the rate counter, said total transfer means including switch means to simultaneously actuate the rate counter to set to the total counter and to actuate the readout transfer means to readout count.

5. An electronic scale conveyor apparatus having a conveyor element for through flow of material, comprising detection means for generating a rate weight signal proportional to the weight of material delivered per unit of time by said conveyor element, a digital rate counter, a clock source for driving said digital counter, logic circuit means coupled to said detection means and said digital counter to cyclically actuate said counter to detect the weight rate of material conveyed, said detection means includes a speed detection means to generate an output in accordance with speed, said logic circuit means includes a bias supply means, a pulse source coupled to and driven from said rate weight signal, said bias supply means being controlled by said speed detection means and operable to inhibit said pulse train source means and automatically begin a new count unit cycle, and manual control means to selectively stop and start the conveyor element.

6. An electronic scale conveyor apparatus having a conveyor element for through flow of material, comprising detection means for generating a rate weight signal proportional to the weight of material delivered per unit of time by said conveyor element, a digital rate counter, a clock source for driving said digital counter, logic circuit means coupled to said detection means and said digital counter to cyclically actuate said counter to detect the weight rate of material conveyed, said detection means includes a weight sensitive means driven from a source, a velocity signal generator is coupled to the conveyor element and generates a train of pulse signals proportional to the speed of material movement, averaging means connected to said velocity signal generator establishes an average speed signal proportional to the train of pulse signals, a variable gain amplifier connects said source to said weight sensitive means, and a comparing means having an output connected to the amplifier controls the gain of said amplifier in accordance with a pair of inputs, said inputs being connected to the output of the amplifier and to said averaging means.

7. The electronic scale conveyor of claim 6 wherein said velocity signal generator includes a rotating multiple pole magnetic member coupled to rotate in synchronism with the conveyor element movement, a Hall Cell mounted adjacent the magnetic member and generating said pulse signals, a one-shot pulse circuit having an input connected to said Hall Cell and an output connected to said averaging means.

8. An electronic scale conveyor apparatus having a conveyor element for through flow of material, comprising detection means for generating a rate weight signal proportional to the weight of material delivered per unit of time by said conveyor element, a digital rate counter, a clock source for driving said digital counter, logic circuit means coupled to said detection means and said digital counter to cyclically actuate said counter to detect the weight rate of material conveyed, wherein said detection means includes a weight sensitive means driven from a source, a velocity signal generator, a variable gain amplifier connects said source to said weight sensitive means, and a comparing means having an output connected to the amplifier controls the gain of said amplifier in accordance with a pair of inputs, said inputs being connected to the output of the amplifier, and to said velocity signal generator.

9. The electronic scale conveyor apparatus of claim 8 wherein said logic circuit means includes switch means having an input bias supply means, said comparing means being connected to said bias supply means to reset said logic circuit means in response to receipt of a selected output of said velocity signal generator.

10. An electronic scale conveyor apparatus having a conveyor element for through flow of material, comprising detection means for generating a rate weight signal proportional to the weight of material delivered per unit of time by said conveyor element, a digital rate counter, a clock source for driving said digital counter, logic circuit means coupled to said detection means and said digital counter to cyclically actuate said counter to detect the weight rate of material conveyed, wherein said rate counter includes a plurality of binary coded decimal stages including a most significant digit stage and a least significant digit stage, said stages being connected to count to the maximum number and to recycle to a new count, said logic circuit means including integrating means to integrate said rate weight signal and switching means responsive to a selected count of said counter to actuate the integrating means, said switching means being responsive to a selected output of the integration means to sequentially readout said counter and to reset said counter to initiate a new count cycle.

11. The electronic scale conveyor apparatus of claim 10 wherein said switching means operates to readout said counter and to reset said counter within a single output of said clock source for driving said digital counter.

12. An electronic scale conveyor apparatus having a conveyor element for through flow of material, comprising detection means for generating a rate weight signal proportional to the weight of material delivered per unit of time by said conveyor element, a digital rate counter, a separate clock source developing a continuous pulse train signal for driving said digital counter, and logic circuit means coupled to said detection means and said digital counter to cyclically actuate and couple said clock source to said counter to actuate the counter and detect the weight rate of material conveyed, said detection means includes a load cell having relatively moving signal components, said load cell comprising a first support member having means for rigidly mounting of the support member to the conveyor, a second support member having a sensing means for engagement with the conveyor element and correspondingly positioned, first and second spring plates mounted in spaced relation and extending in parallel relationship between said first and second support members and having connecting portions overlapping said support members, means rigidly clamping the spring plates to the support members, each of said spring plates being similarly constructed and including reduced thickness portions between the connecting portions.

13. The apparatus of claim 12 wherein said support members are corresponding plates having flat end portions, said spring plates are corresponding plates abutting said flat end portions, said clamp means being bolt means extending through said spring plates and threaded into the support members, said reduced thickness portions being defined by a pair of parallel spaced portions in the facing portions of said spring plates.

14. An electronic scale conveyor for measuring the weight of material transferred by a conveyor element, comprising a load cell means coupled to the conveyor element and generating an analog rate signal in accordance with the rate weight of material on the conveyor element, a reference signal source, a resettable digital rate counter having binary coded decimal stages adapted to automatically cyclically count to a maximum number in response to a continuous input signal, dual slope integrating circuit means alternatively connected to said load cell means and to said reference signal source, a clock source separate from the integrating circuit means and developing a continuous pulse train signal and connected directly to drive said counter, and logic circuit means connected to said counter and to said integrating means to sequentially connect the load cell and the signal source to the integrating circuit means to oppositely integrate said signals, said logic circuit means generating said continuous input signal, said counter being connected for controlling the connection of the load cell and signal source to the integrating circuit means, said integrating circuit means being connected to said counter and controlling a resetting of the counter and the reversing of the connection of the load cell means and signal source to the integrating circuit means.

15. The electronic scale conveyor of claim 14 having a counter readout, and transfer means for operatively coupling the readout to the counter, said transfer means being connected to said logic circuit means and responsive to the output of the integrating circuit means to transfer the output of the counter to the readout.

16. The electronic scale conveyor of claim 15 wherein said readout includes a multiple segment number unit and a binary decimal decoder activated by said transfer means to read the counter and correspondingly set the number unit.

17. The electronic scale conveyor of claim 14 wherein said conveyor element is driven at a variable speed and said load cell means includes a velocity signal generator coupled to said conveyor element and load cell providing a weight signal, means combining said weight signal and velocity signal to produce an analog rate signal connected to said integrating circuit means, a pulse signal generator driven from said rate signal to produce a corresponding pulse train, a digital total counter having binary coded decimal stages connected to said pulse train to record the total weight delivered by said conveyor element, and means coupling said digital total counter to said rate counter and including manual control means selectively set to force set rate counter to the setting of the total counter for transfer to the readout.

18. The electronic scale conveyor of claim 17 wherein said velocity signal generator establishes an analog signal proportional to the speed of the conveyor element, a variable gain amplifier connected to control said load cell, and a comparing means having an output connected to control the gain of said amplifier in accordance with a pair of inputs, said inputs being connected to the output of the amplifier and to said velocity signal generator.

19. The electronic scale conveyor of claim 18 wherein said velocity signal generator, a Hall cell and a rotating magnetic actuator are coupled to the conveyor element, averaging means connected to the Hall cell and establishing an average speed signal proportional to the Hall cell output.

20. The electronic scale conveyor of claim 18 wherein said logic circuit means includes a bias supply means, said bias supply means being controlled by said comparing means and operable to reset said pulse train source means and automatically begin a new total count cycle, and manual control means to selectively stop and start the conveyor element.

21. The electronic scale conveyor apparatus of claim 17 wherein said pulse signal generator includes an integrator and an output switch means responsive to a selected integrated signal level to reset the integrator and establish a corresponding output pulse signal.

22. The electronic scale conveyor apparatus of claim 14 wherein said dual slope integrating circuit means includes a dual slope integrating amplifier, a rate input switch means connected to said integrating amplifier and connected to said analog rate signal source, a reference input switch means connected to said integrating amplifier and to said reference signal source, said logic circuit means selectively enabling one of said input switch means and sequentially and alternately energizing said input switch means to cause said integrating amplifier to integrate from and back to reference, and a switching amplifier connected to said integrating amplifier and having a first logic level output at a reference output and a second logic level output with the integrating output at other than a reference output, said logic circuit means having rapid switching means and responsive to said first logic level output to disable said reference input switch means and enable said rate input switch means to thereby generate a short duration pulse output from said switching amplifier in response to establishing of said reference output.

23. The electronic scale conveyor apparatus of claim 22 wherein said logic circuit means includes a first output means responsive to the leading edge of said short duration pulse to transfer the counter count to said readout and a second output means response to the trailing edge of said short duration pulse to reset the counter.

24. The electronic scale conveyor apparatus of claim 22 wherein said rapid switching means of said logic circuit means includes a flip-flop circuit means having an output connected to oppositely set said rate and reference input switch means, said flip-flop means being set by the first logic level of the output of the amplifier, plurality binary coded decimal stages of said rate counter includes a most significant digit stage having four binary inputs including a most significant input and a least significant input, and dual logic means connecting said last named inputs to reset the logic flip-flop means and in response to selected corresponding setting of said inputs.

25. The electronic scale conveyor apparatus of claim 22 having a manual control means to stop said conveyor, said control means being connected to reset the integrator without generating of said output pulse signal.

26. The electronic conveyor scale of claim 14 wherein said logic circuit means includes a set-reset flip-flop means, a counter reset dual input gate and a logic set dual input gate, said flip-flop means having a set input connected to said set dual input gate and a reset input connected to the output of the integrating switching amplifier, said flip-flop means having a pair of outputs including a first output connected to oppositely control said rate and reference input switch means and as one input to said dual input counter reset gate and a second output connected to enable said readout means, said counter reset gate having a second input connected to the switching amplifier and having an output connected to reset said rate counter, said logic set dual input gate having a pair of inputs connected to the most and least significant inputs of the most significant counter stage of said rate counter.

27. The electronic scale conveyor apparatus of claim 14 wherein said load cell means includes a differential transformer having a movable core and fixed primary and secondary windings, said velocity signal generator being connected to control the energizing of the primary winding to produce an output voltage proportional to the rate weight of material conveyed, a half wave rectifier connected to the secondary winding, a direct current amplifier connected to said rectifier to produce an analog rate signal.

28. An analog signal generator for generating an analog signal in accordance with the weight of conveyed material delivered by a conveyor, comprising a differential transformer having a movable core adapted to be coupled to and positioned by the conveyor, a speed signal source including a rotating member coupled to the conveyor and a pulse generator actuated by said rotating member, a variable signal source for energizing said transformer and having control means to vary the energizing level, comparing means connected to the output of the variable signal source and of the speed signal source and to the control means to energize said transformer in accordance with the conveyor speed, a rectifier connected to the transformer to generate a direct current voltage proportional to the rate weight of material conveyed, and an averaging means connected to said rectifier to produce an analog rate weight signal.

29. The analog signal generator of claim 28 wherein said rectifier is a half wave rectifier and said averaging means is an operational amplifier having an adjustable resistance and capacitance feedback.

30. The analog signal generator of claim 28 wherein said rotating member is a multiple pole magnet and said pulse generator includes a Hall cell generating a series of pulse signals in accordance with the rotation of the magnet, a one-shot pulse forming circuit, said variable signal source including a high frequency oscillator, an automatic gain amplifier connected to the oscillator and to the transformer, a comparing means connected to the output of the automatic gain amplifier and the passive averaging circuit means, and said automatic gain amplifier having a gain control connected to the output of the comparing means.

* * * * *